United States Patent Office 3,481,693
Patented Dec. 2, 1969

3,481,693
PROCESS OF PREPARING FINELY DIVIDED
REFRACTORY OXIDES
Joseph Francis Skrivan, Stamford, Conn., assignor to
American Cyanamid Company, Stamford, Conn., a
corporation of Maine
No Drawing. Continuation-in-part of application Ser. No.
509,197, Nov. 22, 1965. This application July 16, 1968,
Ser. No. 745,141
Int. Cl. C01g 23/04, 25/02; C01b 33/12
U.S. Cl. 23—1                                    3 Claims

ABSTRACT OF THE DISCLOSURE

A process of preparing finely divided refractory oxides by contacting oxygen and a vaporous metal salt in a jacketed porous or perforated walled reaction zone while maintaining a gas pressure exerted inwardly through the walls of the reaction zone in a manner such that the gas purge rate is higher in one section than in any other section of reactor walls. Preferably, the reaction zone is constructed in a plurality of sections so that more purge gas will pass through the reactor walls in the upstream section of the reaction zone than in the lower section. In this manner, purge gas can be apportioned in greater quantities to areas of greater heat release and product build-up.

---

This application is a continuation-in-part of Ser. No. 509,197, filed Nov. 22, 1965, now abandoned.

This invention relates generally to an improvement in processes for making particulate oxides of refractory metals. More particularly, it relates to an improvement in the reactor structure for high temperature processes for producing finely divided titanium dioxide. It relates further to the provision of a plasma jet process for oxidizing metal salts in a reactor of improved design whereby the corresponding refractory metal oxides in finely divided form, are obtained.

As used in this application, the term "metal" includes metalloid elements such as silicon.

A known method of producing oxides such as titanium or silicon dioxide is to react the respective chlorides with oxygen at an elevated temperature. In this method, the reactants may be brought to reaction temperatures by burning an intimately mixed gas such as carbon monoxide or methane. The by-products of burning which may be carbon dioxide or water are thus present during the metal chloride-oxygen reaction. Oxide powders obtained from conventional oxidation processes such as described above are useful for pigmentary, filling, and reinforcing applications.

More recently, a different method has been disclosed which overcomes many of the disadvantages associated with known methods of producing finely divided oxides. It was found in accordance therewith that oxide powders, particularly titanium dioxide, could be produced without utilization of an auxiliary burning gas and with reduced or minimal amounts of nucleating agents by conducting the oxidation of a metal salt with a plasma jet generator. In operating in accordance with this method, a gas is passed through a high energy electric arc and the resulting plasma (the term "plasma" being employed generally herein to designate a very hot, partially ionized gas stream) is contacted with the material to be oxidized and/or oxygen. The plasma is thus the source of heat for raising the reactants to a temperature at which oxidation is initiated. No by-products of burning are introduced into the gas stream and, thus, various problems which have been associated with the prior art methods are obviated. Moreover, in view of the much higher temperatures which are attainable by the plasma jet method, nucleation is much more general even without an added nucleating agent which is perhaps due to the presence of electrically charged species in the plasma.

The general procedure employed in utilizing the plasma jet involves heating a gas such as nitrogen, argon, air oxygen, etc., by means of an arc discharge to form a plasma stream. The reactants are brought into intimate contact with the plasma stream or streams in a manner such that the desired exothermic oxidation reaction is initiated. The resultant oxide product is secured by quenching the reactor effluent and entrapping by conventional means the precipitated oxide powder.

This method is useful for the producion of any kind of refractory metal oxide or mixtures of such oxides. The oxidizable starting material can be any inorganic meal salt such as halide (for example, a chloride) or an oxyhalide (for example, the oxychloride). The metal salts which can be converted are exemplified by salts of silicon, titanium, aluminum, zirconium, iron and antimony although they are not limited thereto. Among the most important of the oxidizable compounds which can be converted by the plasma jet oxidation process are silicon, titanium and zirconium tetrahalides. These materials give oxide powders which are widely used in pigment, rubber and paper applications. Aluminum oxides suitable for synthetic gem manufacture may also be produced by oxidation of the corresponding aluminum salt.

It has been observed that during the production of the finely divided solids, particularly in making titanium dioxide, the solid product tends to build up on the reactor walls. This effect occurs generally in all types of synthesis of refractory oxides of metals and leads to severe problems in both operating efficiency and product quality. It has been attempted to solve this problem by the use of a jacketed, porous walled reactor designed to permit air or other gas to be forced through the walls, as a purge therefor. The air or other gas acts as a purge to reduce buildup of solids on the reactor walls. However if the gas is distributed uniformly over the surface to be purged, the flow is insufficient to prevent build-up in the critical areas where build-up is more troublesome. If it is attempted to overcome this deficiency by increasing the over-all purge rate, then the purge gas volume is excessive and results in undersirable dilution of the product stream. Excessive dilution is a drawback in commercial processes where it may be important to recover a part of the reaction product stream for later use.

It is an object of this invention to obtain improvements in high temperature reactions for production of refractory metal oxides and other refractories by use of improved means for conducting said reactions.

It is another object of the invention to provide an improved process for production of refractory metal oxides by using a purged wall reactor provided with means for an inwardly directed gas purge to avoid buildup of solids on the walls of the reactor without excessive reaction product dilution.

It is another object of the invention to use a multi-section porous or perforated walled jacketed reactor in a high temperature process for making metal oxides.

It is a further object to produce more uniform particulate oxides in a plasma jet reaction using a novel multi-section purged walled reactor.

Other and further objects of this invention will become evident from the description and details of the invention set forth hereinafter.

In accordance with this invention it has been found that the foregoing objects are accomplished by conducting the reaction in a reactor in which the purge gas can be introduced at different rates along the length of the reactor walls. This technique reduces substantially the solids buildup in critical regions and thereby permits continuous operations for long durations. Furthermore, the overall process efficiency is high since the purge gas can be introduced in controlled quantities which accomplish the purging function without excessive product dilution.

The material for making the reactor walls may be any refractory substance such as nickel or certain nickel alloys, and alumina compositions which can be prepared in a porous or perforated form and also resist reaction conditions with or without cooling by usual means.

The thickness of the reactor walls can be varied. Walls of from $\frac{1}{16}''$ to $\frac{1}{2}''$ have been studied and found satisfactory. It is also useful to employ porous reactor walls having pores of varying sizes. Pore sizes of from 65 to 20 microns have been found operative in practicing the invention. In addition, walls having perforations can be used. Perforations in the range of $\frac{1}{64}''$ to $\frac{1}{4}''$ and larger are satisfactory. A given reactor may have both porous and perforated sections, i.e. permeable.

It is critical for the operation of this invention that the zones of different purge rates be in the proper relationship relative to the flow of the reactant stream. Thus the purge rate should be higher in the part of the reactor where the heat release and solids build up tend to be the greatest. In oxidation reactions which are exothermic the region requiring highest purge rates i.e., the upstream section of the reactor, is close to the point where the reactants are brought into reactive contact with each other. The upstream section is designed to permit higher purge rates than in the downstream section or sections where the heat release and the tendency of product build-up is lower.

Purge rates can be adjusted for the purposes of this invention in a variety of ways. The reactor wall may have graded porosity or be differentially perforated along its length, or the upper and lower reactors may be separately jacketed or a combination of these expedients may be employed. Thus, if a single jacket surrounds the reactor, and the purge gas pressure is uniform over the entire length of the reactor then the desired purge gas differential is obtained by constructing the reactor in two or more separate sections which permit higher purge gas flows in the upstream sections than in the downstream sections. However, in a preferred embodiment of the invention, the controlled differential purge gas flow is obtained by use of a reactor having a plurality of jacketed regions such that different pressures can be maintained around various zones of the reactor wall. In following this modification, it should be noted that the material of which the reactor wall is constructed can be uniformly pervious or alternatively materials of different permeabilities can be used in each section. The jacket or jackets surrounding the reactor must have one or more openings to premit introduction of the purge gas. A typical reactor useful in the invention is composed of a jacketed tube having upstream and downstream ends. In communication with the upstream end are means for introducing reactant materials (e.g. an oxygen-containing gas and a vaporous salt). The downstream end is open to permit exiting of the reaction products. One or more jackets surround the reactor, each jacket having means for introducing the purge gas under pressure.

The improvement can advantageously be used in any high temperature (e.g., plasma jet) process in which deposition of solids on the reactor walls results and causes curtailment and interruptions of operating time. Typical examples of reactions where this type of problem occurs are the production of titanium dioxide from titanium tetrachloride and oxygen, the production of aluminum oxide from aluminum chloride and oxygen, production of zirconium dioxide from zirconium tetrafluoride and water.

It is preferred to use air as a wall purge gas, (for instance, in the plasma jet process making titanium dioxide from titanium tetrachloride). It is, however, also possible to use nitrogen, oxygen, carbon monoxide, recycle off-gas from the reactor as well as other gases and mixtures of gases both inert and reactive to the system.

In accordance with the present invention, a Y-type configuration reactor may be used. This apparatus is more completely described in my copending application Ser. No. 430,263, filed Feb. 4, 1965, and entitled "Production of Oxides by Plasma Process," now U.S. Patent No. 3,275,-412, issued Sept. 27, 1966. At least one of the reactants is separately admixed with a plasma stream. For example, a metal or metalloid salt can be admixed with one stream of heat-supplying plasma, and, if desired, the oxygen-containing gas can be separately admixed with another stream of heat-supplying plasma. The two streams, at least one of which has been heated by a plasma stream, are brought together after the salt and/or oxygen have sufficient combined enthalpy to bring the mixture of reactants to reaction temperature. If only one reactant is heated with a plasma stream, it must have sufficient excess heat to raise the ultimate reaction mixture to reaction temperature. If all reactants are heated to above reaction temperature, then compensation is not necessary and none of the reactants must be heated much above the temperature at which reaction is initiated.

The inert fluid used to form the plasma may be any gaseous material such as nitrogen, xenon, argon or helium. It is preferable that air is not used as the plasma heating the metal or metalloid salt. Either air or oxygen can be used to form the plasma used in heating the oxidizing gas and indeed may itself constitute the oxidizing gas.

Generally, the plasma should be heated to a temperature of about 3,000° C. to 12,000° C. prior to being admixed with the reactant. The quantity of reactant salt or salts which is admixed with a given amount of plasma depends, of course, on the desired reaction temperature and heat losses expected to occur before the reactants are admixed. In most operations, the quantity of plasma will be about 3–95% of the total gas mixture and preferably about 5–45% of the volume of the gas. The total volume of gases should be such that reactant streams flow together with turbulent mixing. It is understood that the inert gas used to form the plasma may be preheated by any practical means before being fed into the plasma generator and, likewise, the individual reactants may be preheated by such means as recycle of reaction zone effluents. Normally, such conventional heat exchange methods can raise either the reactants or the inert gas to temperatures of about up to 600° C.

The temperature at which the oxidation reaction is initiated will, of course, depend upon the particular material being oxidized. Initiation temperatures are well known for such salts as the halides of aluminum, silicon, titanium, antimony and boron. The actual temperature to which the reactants are raised may be well above the initiation temperatures in order to hasten the rate of reaction and to reflect particle size requirements. The reaction temperature in the reaction zone for titanium dioxide is about 800° to 2000° C. In general, the reaction mixture should remain in the zone of reaction for a period of at least 0.001 second and, partically speaking, the residence need not be longer than one second. More usually, a residence of about 0.02 to .1 second is adequate and will give the product in the desired particle size In the case of titanium dioxide where it may be desired to enhance the yield of the rutile crystalline form as against the anatase form, a small amount of aluminum chloride may be fed into the reactant stream with the titanium tetrachloride. The amount of aluminum chloride used for this purpose may vary over a wide range. In general, about 0.16 to 6.3% or, more preferably, 1.6 to 4.7% by weight of the product oxide should be employed.

While there are above disclosed but a limited number of embodiments of the invention herein presented, it is possible to produce still other embodiments without departing from the inventive concept herein disclosed.

EXAMPLE 1

The Y configuration burner hereinbefore described was used. Three lbs./hour of $N_2$ plasma having an enthalpy of 5560 B.t.u./lb. were used to heat 14.3 lbs./hour of oxygen and 3 lbs./hour of $N_2$ plasma having an enthalpy of 6040 B.t.u./lb. were used to heat 52 lbs./hr. of $TiCl_4$ containing about 0.6% $AlCl_3$. These streams were mixed and introduced into a porous walled cylindrical reactor fabricated of nickel, having a length of 12″, an inside diameter of 2″ and a wall thickness of 1/8″. The reaction temperature, calculated as the adaibatic flame temperature, was approximately 1850° K. Twelve lbs./hour of air were passed through the reactor wall pores by maintaining air pressure in a jacket disposed about the reactor. Cooling of the wall was effected by water cooling coils on the reactor wall. After thirty minutes of operation, the reactor walls were inspected and approximately 1/4-1/2″ thickness of build-up of solid product was found in the upstream three inches of the reactor, sufficient to significantly restrict the flow of the product stream. The lower 9″ of the reactor were substantially free of build-up, only a light dusting being evident.

EXAMPLE 2

A procedure similar to that described in Example 1 was carried out, except that the reactor was constructed of two sections. The upstream section was 3″ long and 2″ inside diameter; the downstream section was 9″ long and 2″ inside diameter. Nine lbs./hour of air were purged through the upstream section and three lbs./hour through the downstream section. As observed after three hours of operation, the effect of the higher flow rate of air through the more critical upstream zone resulted in a substantial reduction of solids accumulation in this area, a uniform deposit of 1/8″ maximum thickness being found. The downstream section contained a deposit of approximately 1/16″ thickness.

EXAMPLE 3

A procedure similar to Example 2 was carried out, except that the reactor sections were fabricated of perforated nickel, 1/16″ thick with uniformly spaced circular perforations 1/16″ in diameter. The open area for flow through the wall was 22%. Purge rates through the wall sections were the same as in Example 2, and after three hours of operation, an even thinner build-up was observed, due to improved cooling of the wall.

EXAMPLE 4

Similar to Example 3, a further experiment was made using a three section reactor. Proceeding from the upstream end, these sections were 1″, 2″ and 9″ in length, of perforated Inconel wall construction having the same thickness and perforation distribution as Example 3. The purge gas was chlorine and the respective purge rates through the reactor sections were 3.7, 18.4 and 7.4 lbs./hour. After six hours of continuous operation, examination showed negligible solids build-up in all sections.

EXAMPLE 5

In a manner similar to Example 3, an experiment was performed in which the upstream zone was a 3″ long section of porous Inconel nickel alloy purged by 9 lbs./hour of air and the downstream zone was a 9″ long perforated nickel section purged by 7.4 lbs./hour of chlorine. The condition of the reactor wall after three hours of operation was substantially the same as that described in Example 2.

I claim:
1. In the process of preparing finely divided refractory oxides by contacting an oxygen containing reactant stream with a reactant stream containing at least one vaporous metal salt, the oxygen containing reactant stream containing at least the stoichiometric amount of oxygen, passing the resultant mixture of reactants into the upstream end of a reaction zone, maintaining said mixture in the reaction zone for a period of about .001 to 1 second to obtain a reaction product consisting of the oxide product and a reaction off-gass, which leave the reactor from the downstream end of said zone, the improvement which comprises forming the walls of said reactor zone in a multiplicity of sections from heat resistant gas permeable materials and maintaining a purge gas pressure exerted inwardly, through the passages of the reactor walls during the reaction in a manner such that the purge gas rate is greatest in the upstream sections of the reactor walls.

2. The process of claim 1 wherein at least one of the reactant streams is admixed with a gaseous fluid heated by means of a plasma generator.

3. The process of claim 1 wherein the purge gas is recycled reactor off-gas.

References Cited

UNITED STATES PATENTS

| | | | |
|---|---|---|---|
| 2,670,275 | 2/1954 | Olson et al. | 23—202 |
| 2,957,753 | 10/1960 | Nelson et al. | 23—202 |
| 3,203,763 | 8/1965 | Kruse | 23—202 |
| 3,275,411 | 9/1966 | Freeman et al. | 23—202 |
| 3,275,412 | 9/1966 | Skriran | 23—202 |

EDWARD STERN, Primary Examiner

U.S. Cl. X.R.

23—139, 140, 142, 144, 149, 182, 200